United States Patent
Ilg

(10) Patent No.: US 7,176,783 B1
(45) Date of Patent: Feb. 13, 2007

(54) DEVICE FOR IDENTIFYING AUTHORIZATION AND TRIGGERING, ENABLING AN ACTION, PREFERABLY AN ELECTRONIC LOCKING DEVICE FOR MOTOR VEHICLES

(75) Inventor: Johannes Ilg, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 1172 days.

(21) Appl. No.: 09/640,552

(22) Filed: Aug. 17, 2000

(30) Foreign Application Priority Data

Aug. 17, 1999 (DE) .................................. 199 38 898

(51) Int. Cl.
H04L 9/32 (2006.01)
G06K 19/00 (2006.01)
B60R 25/00 (2006.01)

(52) U.S. Cl. .................. 340/5.26; 340/5.72; 340/10.1; 340/10.4; 307/10.5; 180/287

(58) Field of Classification Search .............. 340/5.26, 340/5.7, 5.72, 5.64, 10.1, 10.4
See application file for complete search history.

(56) References Cited

U.S. PATENT DOCUMENTS 3,750,168 A * 7/1973 Schrader et al. .............. 342/30
5,157,389 A * 10/1992 Kurozu et al. ............... 340/5.3
5,412,379 A * 5/1995 Waraksa et al. ............ 340/5.26
5,461,386 A * 10/1995 Knebelkamp ................. 342/44
5,710,548 A * 1/1998 LeMense ................ 340/825.69
5,838,257 A * 11/1998 Lambropoulos ............ 340/5.61
6,130,623 A * 10/2000 MacLellan et al. .......... 340/5.1
6,169,474 B1 * 1/2001 Greeff et al. .............. 340/10.1
6,265,963 B1 * 7/2001 Wood, Jr. .................. 340/10.4

* cited by examiner

*Primary Examiner*—Wendy R. Garber
*Assistant Examiner*—Clara Yang
(74) *Attorney, Agent, or Firm*—Baker Botts L.L.P.

(57) ABSTRACT

A device for identifying authorization and triggering/enabling an action. The device comprises a base unit that detects identity information of a key unit, compares it with predetermined identity information and, if there is a match, triggers or enables the action. The base unit and the key unit each include synchronous generators outputting digital information that changes at predetermined time intervals. The key unit combines information of the digital generator with stored identification code to form a coded information item. The base unit codes the predetermined identity information with information from its own generator and compares this coded information with the coded information from the key unit. If the base unit detects the coded information, the action is triggered. The base unit outputs a signal, the key unit switches an antenna between matched and mismatched states, the antenna reflects the received signal, and base unit evaluates the reflected signal.

16 Claims, 2 Drawing Sheets

DEVICE FOR IDENTIFYING AUTHORIZATION AND TRIGGERING, ENABLING AN ACTION, PREFERABLY AN ELECTRONIC LOCKING DEVICE FOR MOTOR VEHICLES

CLAIM FOR PRIORITY

This application claims the benefit of priority based on German Patent Application No. 19938898.9, filed 17 Aug. 1999, the disclosure of which is incorporated by reference herein in its entirety.

FIELD OF THE INVENTION

The invention relates to a device for identifying authorization and triggering/enabling an action, preferably an electronic locking device for motor vehicles.

BACKGROUND OF THE INVENTION

Electronic locking devices for motor vehicles are known in many forms. Vehicles manufactured at present often have a locking device in which a base unit, preferably a transceiving device, is provided in the vehicle and the vehicle driver carries with him a conventional vehicle key which additionally has at least one manually triggerable transmitter. The transmitter is usually activated by operating a pushbutton or by the triggering of a snap-action mechanism in which the key is rotated from a retracted rest position into a lockable position.

In the simplest case, the transmitter, after having been activated, transmits a code, for example a relevant bit sequence, to the base unit in the motor vehicle which compares the received bit sequence with a stored bit sequence and, if they agree, triggers an operation of the lock. However, this technique entails the risk that the transmitted key, i.e. the transmitted bit sequence, is "monitored" and unauthorized persons can attain access to the vehicle.

For this reason, electronic locking systems have been developed in which the code triggering an action changes in each case or at predetermined time intervals. For example, it is known that the base unit in the motor vehicle transmits a random bit sequence to the key unit on request, wherein the key unit, after receiving the random bit sequence, codes the latter by using a predetermined rule and sends it back to the base unit. The base unit also knows the coding rule and compares the received coded bit sequence with the expected result or, respectively, decodes the bit sequence by using a corresponding decoding rule and compares the decoded bit sequence received with the bit sequence sent out. If they match, the corresponding action, for example the triggering or the enabling of a locking process or unlocking process is then effected again.

A disadvantage of this known system is the mandatory presence of a transmitter in the electronic key unit and the associated expenditure and the energy requirement that depends on the transmitter.

In recent times, the development tends to construct an electronic locking device in such a manner that the desired or required actions are automatically triggered or at least enabled at the motor vehicle. For example, when the vehicle driver approaches the motor vehicle, at least the relevant vehicle door should be unlocked after he has come closer than a predetermined minimum distance.

German Patent No. 35 32 156-C2 discloses a locking device for motor vehicles in which a corresponding, continuously running oscillator with accurate timing is provided both in the base unit and in the key unit. The two oscillators are synchronized with one another at a predetermined counting rate to an associated generator of sequences of numbers. Both generators contain a predetermined sequence of numbers which they continue to count, pulse by pulse, at matching rates and output the current count to the input of a computer or, respectively, a coding unit at the same time. At another input of the computer, a read-only memory is connected which informs the computer of an invariable characteristic code number of the key unit (identification code). Both the identification code and the count are combined in both the key unit and the base unit to form a combination code in accordance with a predetermined matching algorithm. The combination code is transmitted by the key unit to the base unit, wherein the base unit triggers a control pulse which operates various lock processes when codes match.

Although this creates a burglary-proof locking device, this device also requires an active transmitter in the key unit, with the corresponding energy consumption.

Various techniques are known to keep the energy consumption in the base unit and/or the key unit as low as possible. For example, it is known to activate the receiver in the key unit continuously and to cause the base unit in the motor vehicle to output a corresponding signal only when a door handle of the motor vehicle is mechanically operated, which signal then triggers a corresponding interaction between the key unit and the base unit that leads to the unlocking of the lock. Although this makes it possible to achieve a drastic reduction in the energy consumption in the base unit, the key unit must be continuously ready for reception, or in sufficiently short time intervals. This leads to a corresponding energy consumption in the key unit.

Furthermore, it is known also to clock the key unit so that the information triggering the desired action is only sent at particular time intervals. Although this leads to a reduction in the energy consumption at the key unit end, the response time is extended until the desired action is triggered.

Finally, it is known in transmission engineering to modulate a radio-frequency carrier virtually without power consumption, by changing the matching of an antenna by a modulating signal. This results in a modulated signal reflected or backscattered by the antenna. This method is also called backscatter modulation.

SUMMARY OF THE INVENTION

The invention is based on creating a device for identifying authorization and triggering/enabling an action, preferably an electronic locking device for motor vehicles which avoids the aforementioned disadvantages and which, in particular, has sufficient security and the least possible energy consumption, particularly at the key unit end.

According to the invention, the combination of backscatter modulation transmission with a coding and decoding method using two generators of sequences of numbers provided in the base and key units that are running synchronously results in the advantage of maintaining adequate "security against monitoring" in connection with extremely low energy consumption in the key unit.

According to the preferred embodiment of the invention, the base unit generates a radio-frequency carrier signal by means of a corresponding radio-frequency generator, which is frequency modulated with a low-frequency ramp-like function, for example a triangular function.

This creates the possibility of separating the backscatter signals generated by a number of key units which are located at different distances from the antenna emitting the radio-frequency carrier signal, by analyzing the frequency spectrum or, respectively, by corresponding filtering.

The received backscatter signal is preferably demodulated by means of a quadrature down-converter that is also supplied with the radio-frequency carrier signal in addition to the received signal. In principle, the quadrature down-converter correlates the received signal with the transmitted signal and supplies the demodulated signal to the central evaluating and control unit of the base unit. This can then perform further signal evaluation.

In particular, the evaluating and control unit can also determine the distance of the key unit from the antenna of the base unit if a radio-frequency carrier signal frequency modulated with a ramp-shaped signal is used.

According to one embodiment of the invention, the base unit exhibits two or more, preferably three antennas so that the position of the key unit relative to the relevant object or to a reference point, respectively, can be determined from the distance of the key unit from the respective antenna. Thus, it is possible, for example, to unlock only the relevant door and to keep the other doors locked when the vehicle driver who is carrying the key unit approaches the vehicle. Furthermore, it is possible to deactivate the electronic immobilizer of the motor vehicle only when the base unit has found that the vehicle driver is in the vehicle.

According to an embodiment of the invention, the base unit exhibits a modulator, which can be supplied with a data signal by the evaluating and control unit, in the transmitting branch, preferably between the radio-frequency generator and an antenna amplifier. This also allows for data transmission from the base unit to the key unit.

The key unit preferably comprises a central evaluating and control unit which controls the digital, accurately timed generator, a memory for the identification code, a coding unit and a ring-connected shift register in such a manner that the shift register is loaded with different coded information at predetermined time intervals. This coded information is generated by the coding unit using the current information of the digital generator and of the identification code stored in the memory. The shift register cyclically reads out the information thus generated.

In the preferred embodiment of the invention, the output signal of the shift register is supplied as an input signal to a frequency modulator so that the controllable electronic switch changes the matching state of the key unit antenna in accordance with the modulated auxiliary-carrier frequency of the frequency modulator of the key unit.

An advantage of using this auxiliary-carrier frequency, particularly in the receiver circuit of the base unit, is that after the demodulation of the backscatter signal, the auxiliary-carrier frequency signal modulated with the information from the shift register of the key unit occurs. This "intermediate-frequency signal" can be amplified and particularly filtered more effectively. Naturally, to obtain the actual information to be transmitted, a further demodulation of this signal by means of an auxiliary demodulator unit is possible but it is not absolutely necessary since such a demodulation can also be performed by numeric methods by the evaluating and control unit after discretization and transmission to the latter.

However, using an auxiliary demodulator unit provides the advantage that the hardware demodulation is much quicker than would be possible with purely mathematical methods. In this context, the evaluating and control unit (of the base unit) can first determine, for example, whether a valid signal for triggering or enabling an action is present on reception and evaluation of an information item. If so, no further actions are necessary unless selective actions are to be performed that depend on the position of the key unit. In such cases, additional determination of the distance of the key unit from the receiving antenna or from a reference point (if direction-independent distance information is sufficient) or determination of the position of the key unit relative to a reference point is required. This can be done by evaluating the signal supplied directly from the demodulation unit of the evaluating and control unit.

If initially no valid information for triggering or enabling an action is detected (but the reception of an information item is detected), the evaluating and control unit can further evaluate the (discretized and digitized) signal supplied to it by the demodulator unit and find out whether information has been received simultaneously or quasi-simultaneously from a number of key units and separate this information—if a different distance of the key units from at least one of the receiving antennas of the base unit exists—by evaluating and filtering the received signal in the spectral range, or at least detect a collision.

BRIEF DESCRIPTION OF THE DRAWINGS

The accompanying drawings, which are incorporated herein and constitute part of this specification, illustrate presently preferred embodiments of the invention and, together with the general description given above and the detailed description given below, serve to explain features of the invention.

DETAILED DESCRIPTION OF THE PREFERRED EMBODIMENTS

Figure 1:
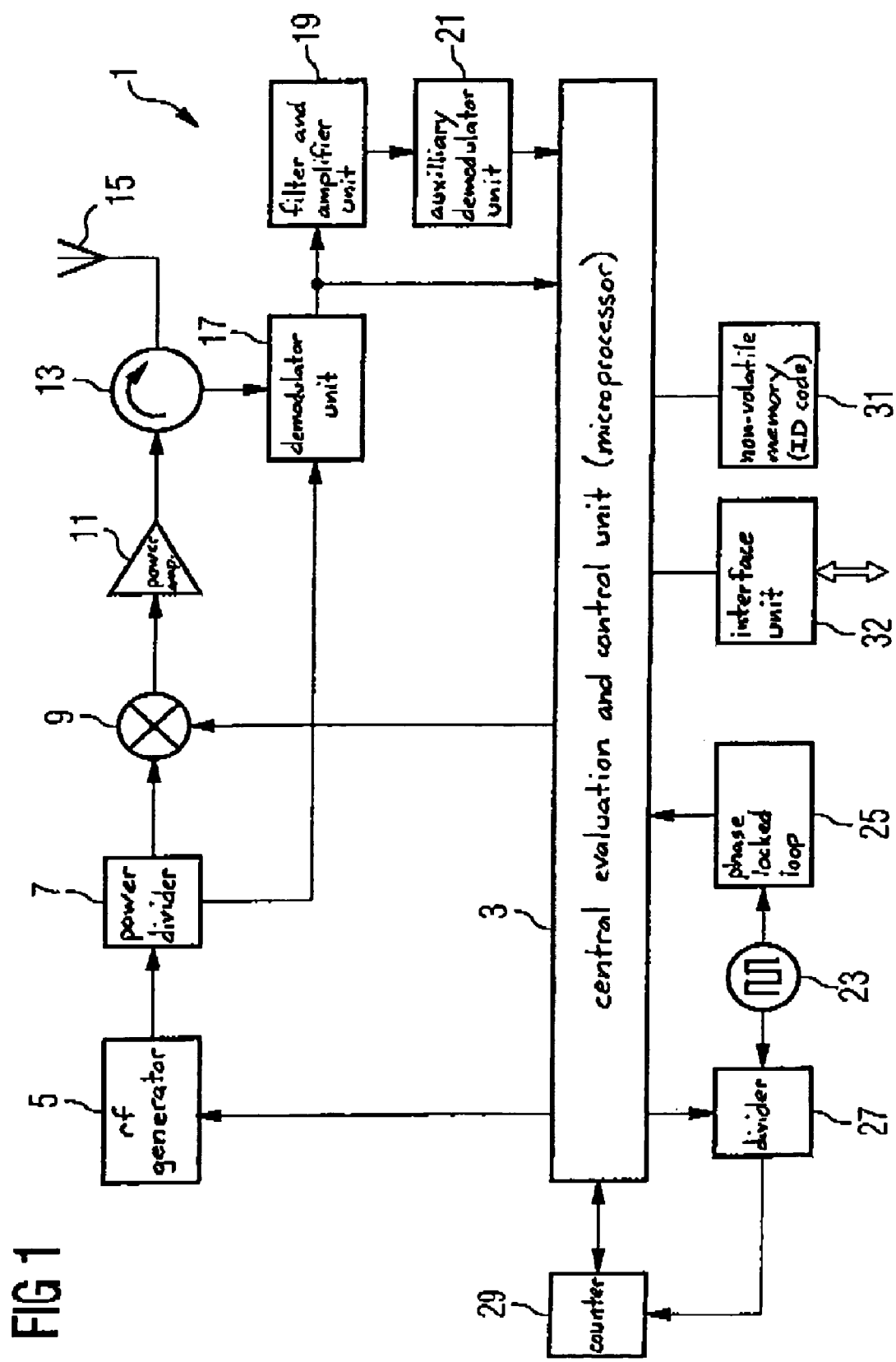
FIG. 1 shows a diagrammatic block diagram of a base unit for a device according to the invention.

FIG. 1 shows a diagrammatic block diagram of a base unit 1 for a device that identifies an authorization signal and triggers/enables an action that can be, for example, an electronic lock for a motor vehicle.

In its core, the base unit 1 consists of an evaluating and control device 3 which can be implemented, for example, as a microprocessor.

The evaluating and control unit 3 controls a transmitting branch of the base unit 1 which consists of a radio-frequency generator 5, a power divider 7, a modulator 9, a power amplifier 11, a circulator 13 and an antenna 15. As shown in FIG. 1, the radio-frequency generator 5 can be driven by the evaluating and control unit 3. In particular, the evaluating and control unit 3 can drive the radio-frequency generator 5 in such a manner that the latter generates a frequency-modulated signal which is produced by the frequency modulation of a preferably fixed carrier frequency with a ramp-shaped modulation signal. The modulation signal is preferably within a range of a few kilohertz and the radio-frequency carrier can have a frequency within the megahertz or gigahertz range. For example, the radio-frequency generator can be constructed and driven in such a manner that the frequency of the output signal rises periodically and linearly from a minimum frequency (for example 2.40 GHz) to a maximum frequency (for example 2.48 GHz) and drops again to the minimum frequency.

The output signal of the radio-frequency generator 5 is supplied as a carrier frequency to the modulator 9 via the power divider 7. The modulator 9 is supplied with a signal of the evaluating and control unit 3 as a modulation signal. This is preferably a binary data signal. However, the data signal is only supplied to the modulator 9 when the base unit 1 actually has to transmit information to the key unit 100 shown in FIG. 2. As will be explained below, however, this is only the case in exceptions.

The output signal of the modulator 9, which is amplified by the power amplifier 11, is supplied via the circulator 13 to the antenna 15 and radiated by the latter. In this arrangement, the circulator 13 conducts the output signal of the power amplifier 11 to the antenna 15 virtually without losses, and supplies the signal received at the antenna 15 to a demodulator unit 17, also essentially without losses.

Naturally, instead of using a circulator, it is also possible to use a second antenna as receiving antenna and to supply its signal to the receiving branch.

The receiving branch of the base unit 1 has, in addition to the demodulator unit 17, a filter and amplifier unit 19 which follows the demodulator unit 17, and an auxiliary demodulator unit 21 which is supplied with the output signal of the filter and amplifier unit 19 and which supplies the received data signal to the central evaluating and control unit 3.

The demodulator unit 17 is preferably constructed as a quadrature down-converter which is also supplied with the output signal of the radio-frequency generator 5 via the power divider 7, in addition to being supplied the received signal.

The base unit 1, also comprises a central clock generator 23 which can have, for example, a clock crystal having a resonant frequency fT of 32.768 kHz. The output signal of the central clock generator 23 is supplied, on the one hand, to a phase-locked loop 25 which generates at its output the clock signal for the central evaluating and control unit 3. The clock signal can have a frequency of, for example, 4–10 MHz. On the other hand, the output signal of the central clock generator 23 is supplied to a divider 27 which can be constructed, for example, as a counter, and divides down the output signal of the central clock generator at a particular ratio. The output signal of the divider 27 is supplied to a counter 29, the information of which, in turn, is transmitted to the central evaluating and control unit 3.

In this arrangement, the divider 27 can be preferably adjusted with respect to the divider ratio by the evaluating and control unit 3. For example, the divider 27 can be constructed as a loadable counter, wherein the number of counting steps per counting cycle can be determined by the evaluating and control unit 3. In this manner, the periodic output signal of the divider 27 can be set with an accuracy of 1/fT. The counter is preferably constructed in such a manner or is driven in such a manner that its output signal has a period of a few seconds, for example 5 seconds. Accordingly, the information supplied to the evaluating and control unit 3 from the counter 29 changes at these intervals.

The base unit 1 also comprises a non-volatile memory 31 in which an identification code is stored.

Finally, the base unit 1 exhibits an interface unit 32 via which information can be supplied to the evaluating and control unit 3 or, respectively, via which the evaluating and control unit 3 can issue certain information to further modules, for example a triggering signal or enabling signal for locking or unlocking a lock.

Figure 2:
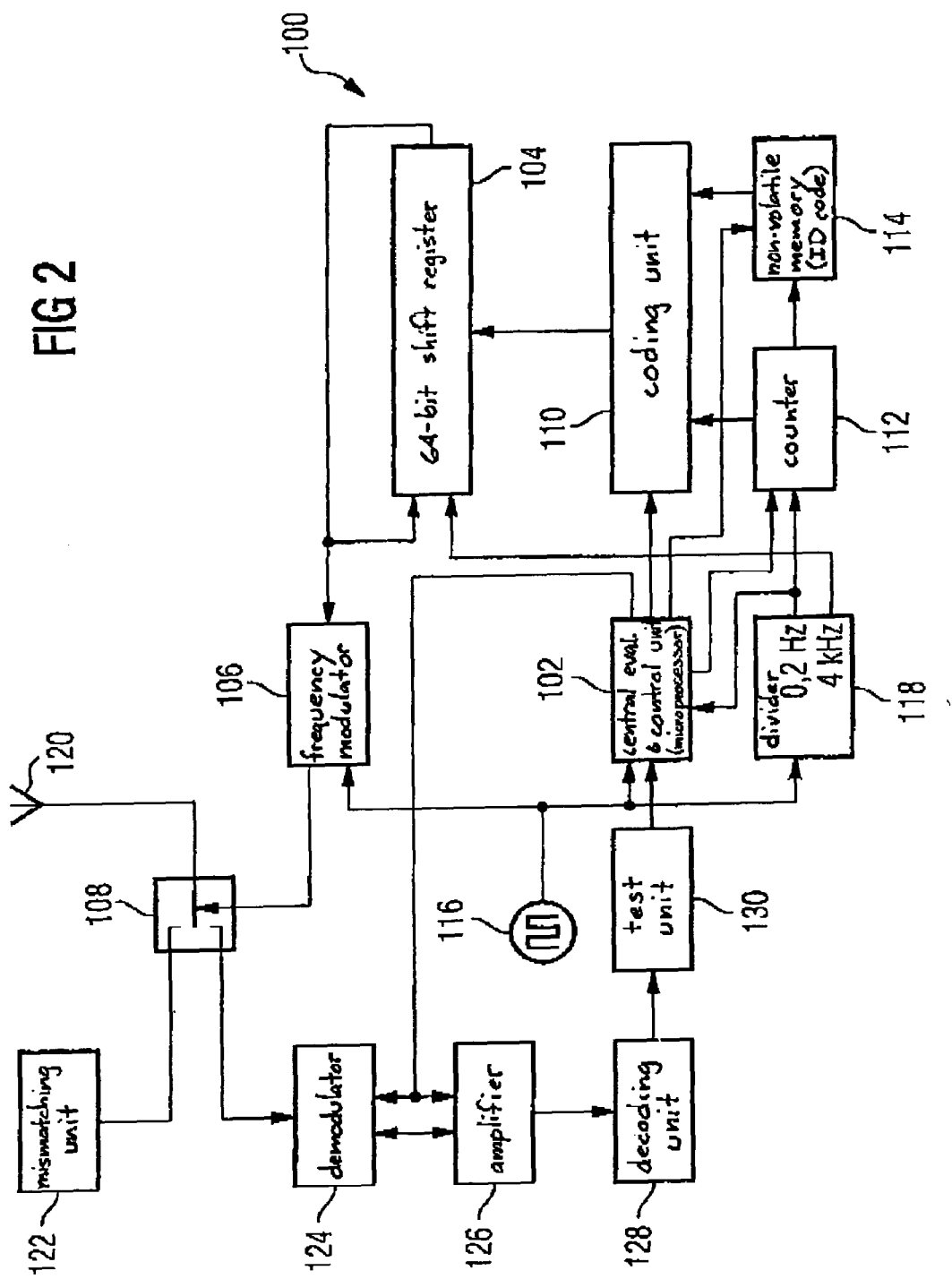
FIG. 2 shows a diagrammatic block diagram of a key unit for a device according to the invention.

The key unit 100 shown diagrammatically as a block diagram in FIG. 2 comprises in its core another central evaluating and control unit 102. This can be again constructed as a microprocessor. The central evaluating and control unit 102 controls a transmitting branch of the key unit 100 which comprises for example, a 64-bit-long shift register 104, a frequency modulator 106, and a controllable electronic switch 108.

A coded information item that is generated by a coding unit 110 is transferred at predetermined time intervals to the shift register 104 of the modulation branch, wherein the count of a counter 112 and the identification code contained in a non-volatile memory 114 are communicated to the coding unit 110 as input information.

The key unit 100 also comprises a central clock generator 116 that is used in a number of ways. On one hand, the output signal of the central clock generator 116 is used as an auxiliary-carrier frequency that is supplied to the frequency modulator 106 as a signal to be modulated. On another hand, the output signal of the central clock generator 116 is used as a clock for the central evaluating and control unit and, in addition, is supplied to a divider 118. As explained in connection with the base unit according to FIG. 1, the divider 118 can be constructed again as a loadable counter so that, in collaboration with the central evaluating and control unit 102, an output signal is produced by the divider, the period of which can be adjusted in very small steps. This output signal, which has a period of a few seconds, for example 5 seconds, is supplied to the counter 112 so that the counter 112 changes its information supplied to the coding unit 110 at these predetermined periodic intervals.

Furthermore, the divider 118 generates a second output signal which is supplied to the shift register 104. This clock signal has a frequency of a few kHz, for example 4 kHz and determines the transmission rate at which the information of the shift register 104 can be transmitted to the base unit 1.

Information transmission from the key unit 100 to the base unit 1 is carried out by applying the frequency-modulated output signal of the frequency modulator 106 to the controllable electronic switch 108, wherein the switch 108 connects an antenna 120 either to a mismatching unit 122 or to a receiving branch which consists of a demodulator 124, an amplifier 126, a decoding unit 128 and a test unit 130.

The input of the demodulator 124, which is connected to an output of the switch 108, is impedance-matched to the antenna 120 in such a manner that, when the antenna signal is switched via the switch 108 to the receiving branch, matching exists. The result is that the antenna is switched between a state of matching and of mismatching depending on the drive signal at the output of the frequency modulator 106. The antenna 120 accordingly reflects a signal received by the base unit 1 differently so that the base unit 1 can receive and evaluate the backscatter signal generated in this manner.

Such a structure of the key unit 100 has the significant advantage that no active transmitting power whatever needs to be delivered and only the matching state of the antenna 120 has to be modulated. However, this requires very little power so that a battery with relatively low capacity is sufficient for long-term operation of the key unit 100.

It should be mentioned at this point that, naturally, the functional units explained above can also be integrated in the central evaluating and control unit 3 and 102, respectively, and a significant part of the base unit 1 or of the key unit 100, respectively, can be constructed as a microprocessor circuit including suitable peripherals. In particular, all the digital signal processing can be done by a microprocessor so that external counters, dividers, an external shift register, an external coding unit and external memories can become (partially or entirely) unnecessary.

In the text that follows, the operation of the device according to FIGS. 1 and 2 is explained in greater detail:

In the normal state, the key unit 100 sends continuously or at predetermined time intervals the coded information which is generated by the coding unit 110 based one the current count of the counter 112 and the identification code in the memory 114. As described above, transmission is effected by an essentially zero-power modulation of the antenna matching state by applying the output signal of the frequency modulator 106 to the controllable electronic switch 108, which frequency modulator modulates the frequency of the central clock generator 116 with the cyclic output signal of the shift register 104.

The base unit 1 can radiate the signal to be modulated by the key unit 100 either continuously, at predetermined time intervals, or following a request signal. As a request signal, for example, the operation of a door handle can be selected and this information can be supplied to the central evaluating and control unit 3 of the base unit 1 via the interface unit 32. Naturally, the carrier frequency signal must be transmitted by the base unit 1 until the entire coded information from the key unit 100 has been detected by the base unit 1.

The backscatter signal received by the antenna 15 of the base unit 1 is supplied via the circulator 13 to the demodulator unit 17, the output of which essentially carries a signal which corresponds to the output signal of the frequency modulator 106 of the key unit 100. This signal is supplied, on the one hand, to the central evaluating and control unit 3 so that the latter can evaluate the spectrum in the case of a number of signals received superimposed from a number of key units 100, which makes it possible to separate the individual signals. For example, the central evaluating and control unit can carry out a fast Fourier transform for this purpose. Due to the carrier frequency signal being frequency-modulated in the form of a ramp, a backscatter signal generated by a key unit 100 located more distantly will have another center frequency in the spectrum than a backscatter signal that is generated by a key unit 100 located closer to the antenna 15.

Furthermore, the output signal of the demodulator unit 17, to which the auxiliary-carrier frequency of the frequency modulator 106 of the key unit is also applied, is amplified and filtered via the unit 19 and then demodulated by means of the demodulator 21. The received data is then supplied to the evaluating and control unit 3.

At the same time as a signal is received, the evaluating and control unit 3 in each case determines the count of the counter 29 and combines it with the identification code in memory 31 by using the same coding rule as is used in the coding unit 110 of the key unit 100. The evaluating and control unit 3 then compares the received data with the coded data generated by it and triggers a corresponding action by communicating a corresponding signal via the interface unit 32 when the coded data that is received matches its own coded data.

Naturally, if the base unit 1 has received a number of information items from a number of key units 100 simultaneously or quasi-simultaneously, a corresponding number of comparisons are necessary.

The base unit 1 can also have a number of (receiving) antennas 15 or a number of receiving branches which have a known distance from one another. In this manner, the base unit 1 can determine the position of a key unit relative to a reference point by determining the respective distance from the relevant antenna, for example by triangulation. To determine the distance, the output signal of the demodulator unit 17 can be used since the latter is supplied both with the output signal of the frequency generator 5 and with the received signal. Thus, each ramp-shaped frequency modulation of the radio-frequency carrier signal results in a different (slowly time-varying) center frequency of the backscattered or reflected signal with different propagation times between the transmitting antenna and the backscatter antenna.

The evaluation of a signal can be carried out in the base unit 1 as follows:

If the evaluating and control unit 3 detects the presence of a received signal, the output signal of the auxiliary demodulator unit 21 can first be checked whether a valid signal for triggering or enabling an action is present. If yes, no further evaluation is required, unless it is intended to determine the distance of the key unit 100 from the antenna(s) of the base unit 1, e.g., in order to selectively trigger actions depending on the position or the distance of the key unit 100 with respect to the base unit 1.

If the presence of a received signal is indeed detected, but there is no valid signal for triggering an action, the evaluating and control unit 3 can determine, preferably from the signal of the demodulator unit 17, by analyzing the signal in the spectral range whether a number of key units 100 have been detected simultaneously. If necessary, the signals can be separated and each individual signal can be tested whether an action has to be triggered in dependence thereon.

Naturally, since the contents of counters 29 and 112 of the base unit 1 and the key unit 100, respectively, change at predetermined time intervals, it is necessary that the counts are changed synchronously and in each case the same counter contents are present at the same times. This requires at the least synchronization of the counts at an output time.

Such synchronization must be carried out, for example, if the two counters 29 and 112 are no longer adequately synchronized due to slightly deviating frequencies of their respective central clock generators 23 and 116, such as may occur when there is a very long time between two identification attempts. If the key unit 100 passes into the receiving range of the base unit 1, and the units are not synchronized, no authorization for triggering/enabling of a corresponding action will be determined. In this case, or when triggered by a further action, such as operation of a door handle, the base unit 1 can communicate a request signal for synchronization to the key unit 100, in which the evaluating and control unit 3 transmits a corresponding information item to the modulator 9. This information item is received by the key unit 100 via the receiving branch. The key unit 100 can then transfer the content of the selected initial state of the counter to the coding unit 110 The latter can supply a coded signal that corresponds to this initial state of the counter to the transmitting branch whereupon this information is transmitted to the base unit 1. The base unit 1, in turn, then accesses the same initial state of its counter 29, determines the relevant coded information and compares the received information with the self-coded information. If identity is determined, the base unit 1 transmits a synchronization set signal to the key unit 100 and resets its own counter 29 to the initial state. In the same manner, the evaluating and control unit 102 of the key unit 100 sets the counter 112 to the same initial state after receiving the synchronization set signal.

Furthermore, the base unit 1, after determining authorization of a key unit 100, can compare the phases of the counters 29 and 112 at different times and determine the amount by which the input clock signals of the counters 29 and 112 deviate from one another. The evaluating and control unit 3 can then alter the dividing ratio of the divider 27 in such a manner that the frequency of the output signal of the divider 27 corresponds as accurately as possible to the frequency of the output signal of the divider 118.

Naturally, such an action can also be carried out by the evaluating and control unit 102 of the key unit 100. However, this increases energy consumption in the key unit 100.

Finally, it should be mentioned that the receiving branch of the key unit 100 could, naturally, also be used for transmitting any desired information to the key unit 100. For example, the identification code can be communicated, preferably during manufacturing, to the evaluating and control unit 102, which then stores this code in the non-volatile memory 114.

For transmitting information, the evaluating and control unit 102 can receive at predetermined intervals a wake-up pulse which can be derived, for example, from the low-frequency output of the divider 118. Following this, the evaluating and control unit 102 can activate the receiving branch and, if necessary, disable the transmitting branch for a brief interval.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A device for identifying authentic information and enabling an action, comprising:
    a) a base unit and a key unit transmitting information to the base unit, the base unit detecting the information and comparing it with predetermined information, the base unit enabling the action when the detected information matches the predetermined information;
    b) the base unit and the key unit include respective accurately-timed digital generators running essentially synchronously with respect to one another and generating digital output information that changes at predetermined time intervals;
    c) the key unit combining the digital information of the key unit digital generator with a stored identification code in accordance with a predetermined coding rule to form a coded information item, the key unit including:
        a central evaluating and control unit controlling the key unit digital generator;
        an identification code memory;
        a coding unit; and
        a ring-connected shift register, the shift register being loaded at predetermined time intervals with a different coded information item generated by the coding unit using the digital information from the key unit digital generator and contents of the identification code memory, and the shift register cyclically reading out the different coded information items, the cyclical readings output from the shift register are supplied as an input signal to a frequency modulator, the frequency modulator generating an auxiliary-carrier frequency which is a multiple below the frequency of the radio-frequency generator of the base unit and a multiple above the cycles of the shift register, and the auxiliary-carrier frequency is supplied to the controllable electronic switch;
    d) the base unit using the predetermined coding rule to code the predetermined information with the digital information of the base unit digital generator to form a predetermined coded information item, and comparing the predetermined coded information item with the coded information item communicated by the key unit, the base unit enabling the action when the coded information item communicated matches the predetermined coded information item;
    e) the base unit transmitting a radio-frequency carrier signal;
    f) the key unit including a controllable electronic switch switching an antenna between an essentially matched state and a mismatched state in accordance with the coded information item, and the antenna reflecting the received radio-frequency carrier signal in accordance with the time changing digital coded information; and
    g) the base unit receiving and evaluating the reflected signal.

2. The device as claimed in claim 1, wherein the base unit includes a central evaluating and control unit driving a radio-frequency generator, the radio-frequency generator generates the radio-frequency carrier signal that is connected to an antenna by a power amplifier.

3. The device as claimed in claim 2, wherein the evaluating and control unit drives the frequency generator in such a manner that the radio-frequency carrier signal is frequency-modulated with a triangular function.

4. The device as claimed in claim 3, wherein the evaluating and control unit separates a number of superimposed signals from a plurality of the key units at different distances, the evaluating and control unit separating the superimposed signals from one another by evaluating a displacement spectra due to the different distances from the base unit and evaluating collisions of the received information items.

5. The device as claimed in claim 2, wherein the radio-frequency carrier signal is supplied to the antenna by a circulator, the circulator supplying essentially all power of the radio-frequency carrier signal of the antenna.

6. The device as claimed in claim 5, wherein the base unit includes a demodulator unit supplied by the circulator with a signal received by the antenna, the demodulator receiving essentially all power of the signal received by the antenna, and the demodulator unit supplying an output signal to the central evaluating and control unit.

7. The device as claimed in claim 6, wherein the demodulator unit is additionally supplied with the carrier signal of the radio-frequency generator and the demodulator unit correlates the carrier signal with the signal received by the antenna for the purpose of demodulation.

8. The device as claimed in claim 6, wherein the evaluating and control unit determines a distance between the base unit and the key unit from the output signal from the demodulator unit.

9. The device as claimed in claim 8, wherein the base unit includes a plurality of antennas, the base unit determining the distance between the key unit and each of the pluralities of antennas, and determining from each distance a position of the key unit with respect to the base unit to enable the action.

10. The device as claimed in claim 2, wherein a modulator is provided between the radio-frequency generator and the antenna, the modulator receiving a data signal from the evaluating and control unit.

11. The device according to claim 10, wherein the modulator is a multiplier.

12. The device as claimed in claim 1, wherein the key unit includes a central evaluating and control unit controlling the key unit digital generator, an identification code memory, a coding unit, and a ring-connected shift register, the shift register being loaded at predetermined time intervals with a different coded information item generated by the coding unit using the digital information from the key unit digital generator and contents of the identification code memory, and the shift register cyclically reading out the different coded information items.

13. The device as claimed in claim 1, wherein the base unit includes a demodulator unit supplies an output signal to an auxiliary modulator unit in the base unit, the auxiliary demodulator unit demodulating the output signal containing the auxiliary-carrier frequency and supplying coded information to the base unit evaluating and control unit.

14. The device as claimed in claim 1, wherein the base unit transmits the radio-frequency carrier signal continuously.

15. The device as claimed in claim 1, wherein the base unit transmits the radio-frequency carrier signal at predetermined time intervals.

16. The device as claimed in claim 1, wherein the base unit transmits the radio-frequency carrier signal following a request signal.

* * * * *